Jan. 10, 1967  B. A. ANDREWS ET AL  3,297,373
AUTOMATIC CAFETERIA COUNTER
Filed Oct. 15, 1964  3 Sheets-Sheet 1
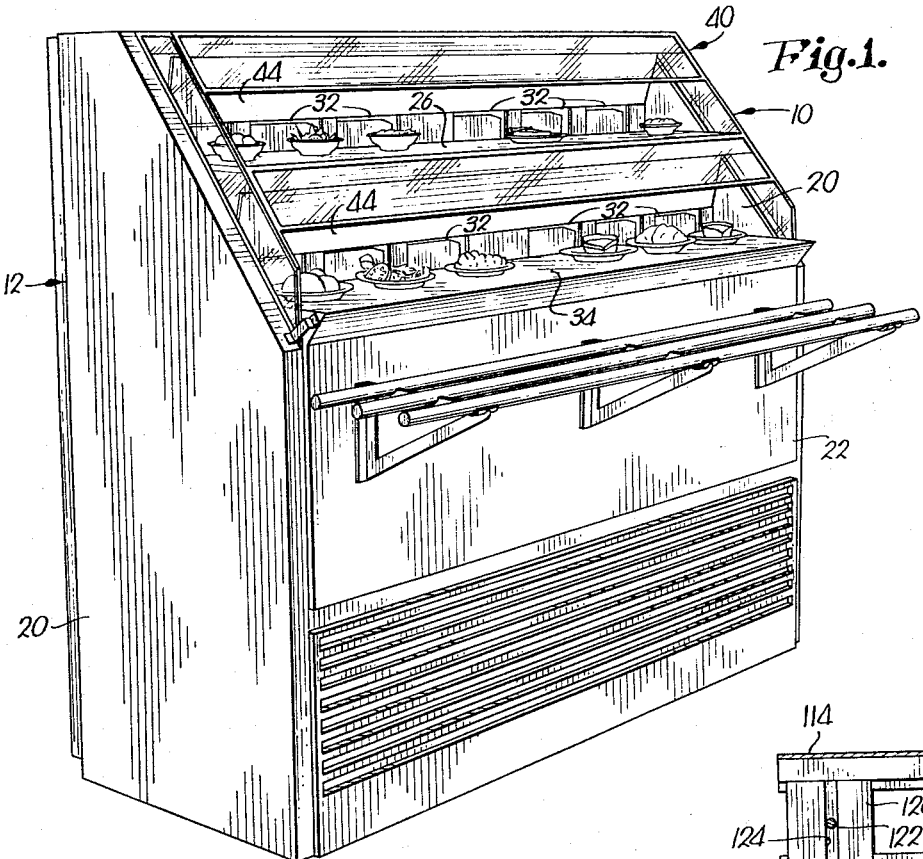
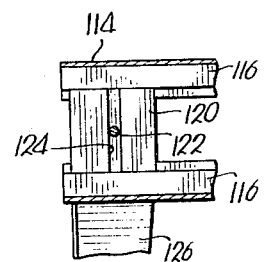
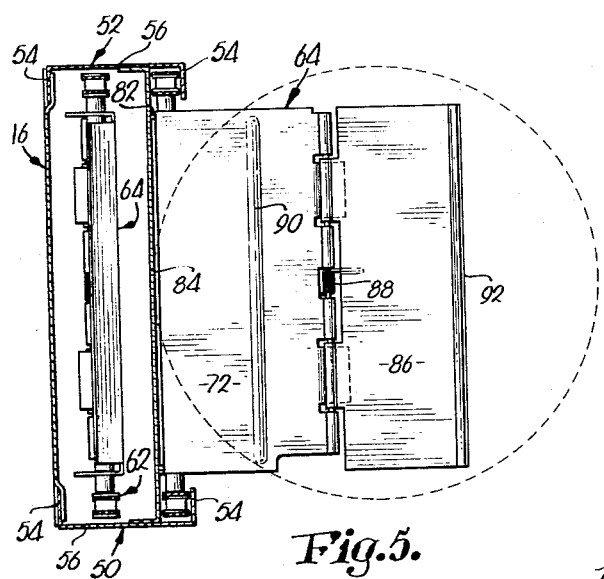
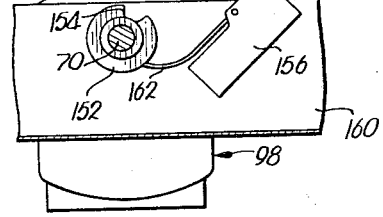
INVENTORS.
Boley A. Andrews
LeRoy D. Gore
BY James F. Ptacek
Hovey, Schmidt, Johnson & Hovey
ATTORNEYS.

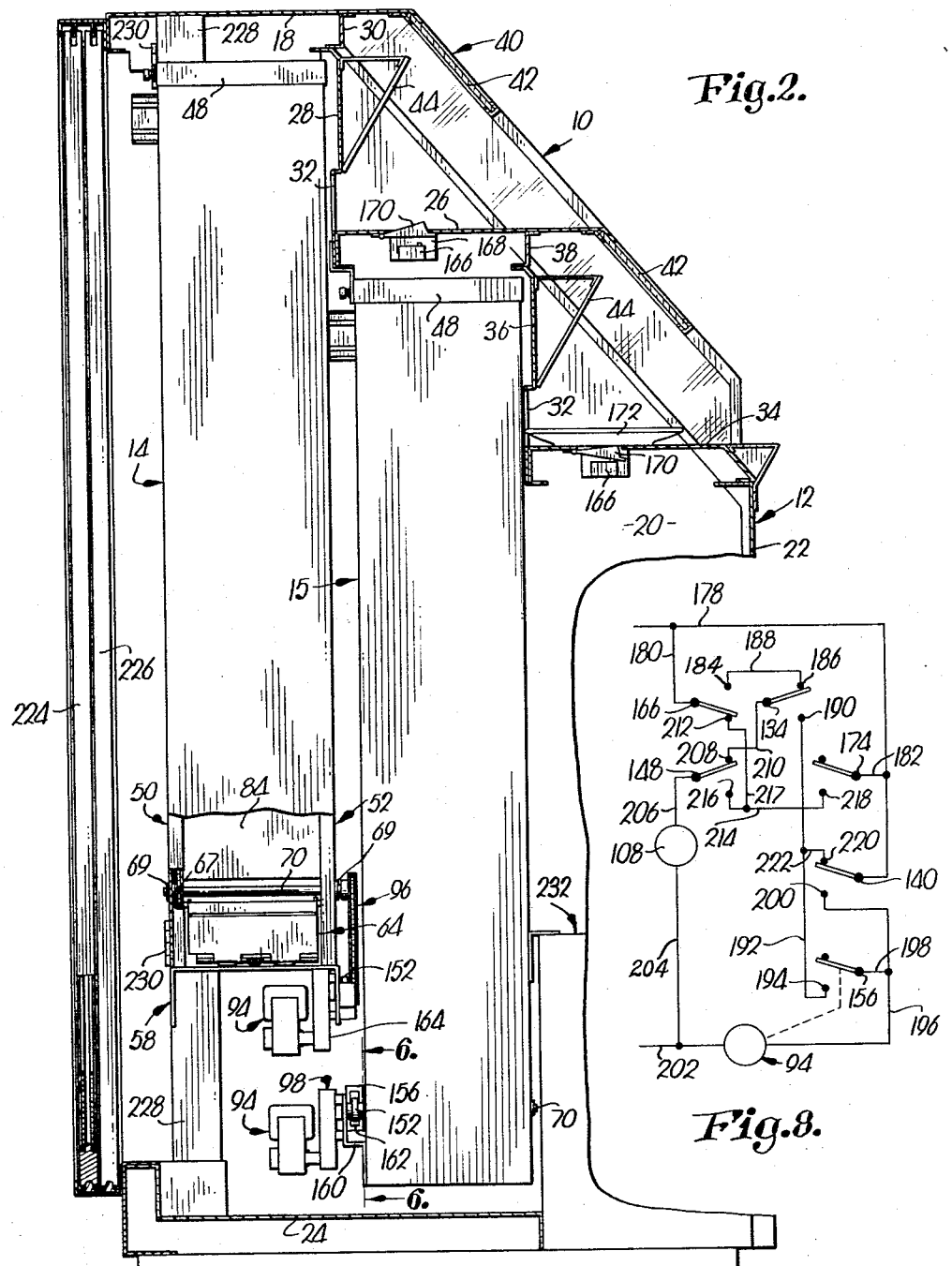

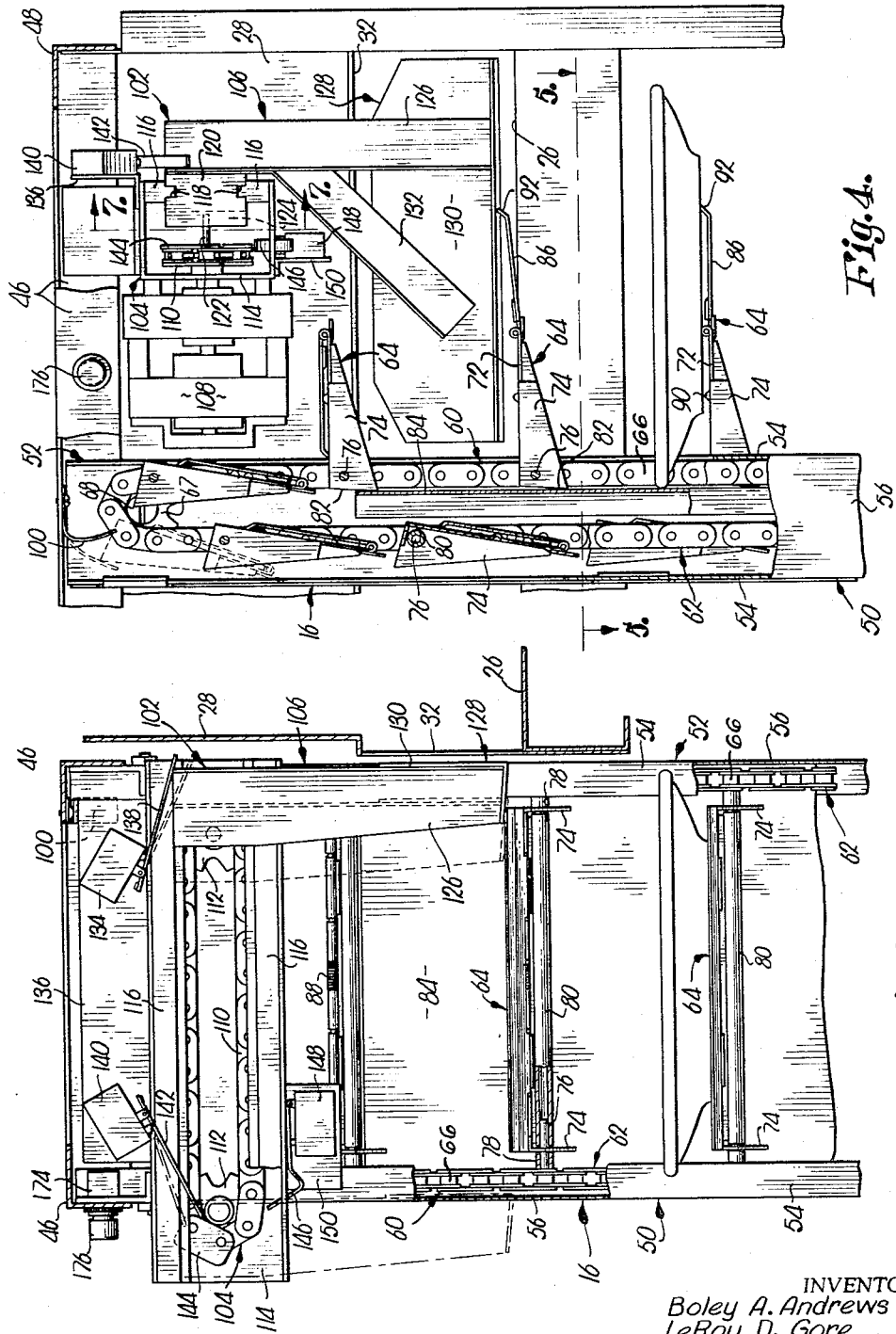

3,297,373
AUTOMATIC CAFETERIA COUNTER
Boley A. Andrews, Mission, Kans., and Le Roy D. Gore and James F. Ptacek, Independence, Mo., assignors to The Vendo Company, Kansas City, Mo., a corporation of Missouri
Filed Oct. 15, 1964, Ser. No. 404,094
6 Claims. (Cl. 312—97)

This invention relates to dispensing structure and more particularly to apparatus for automatically replacing a product from a supply thereof to a customer accessible location after removal of a product therefrom by a customer.

Certain merchandising operations, such as the provision of foods to be selected by a customer in a cafeteria serving line, require the availability of items subject to great, but intermittent demand over relatively short periods of time. This necessitates substantially prestocking of the items for availability during periods of peak demand. Further, particularly with food items, it is desirable that the customer actually be able to see the precise item which he receives rather than be presented with certain display items from which he is asked to make a selection subsequent to which he is furnished another item of the kind he selected from a supply hidden from view.

It has heretofore been conventional practice for operators of cafeterias and the like to provide rather large display units having a susbtantial number of each kind of food items available for selection by the customer and in sufficient quantities to accommodate the requirement for the items during peak demand periods as at meal time. Such displays are often quite bulky and usually necessitate the additional expense of requiring a serving line attendant to maintain the items in locations which are readily accessible to the customer.

It is, therefore, a primary object of this invention to provide apparatus for stocking and automatically supplying items to a customer accessible location to replace items removed by the customers, without the need for any operator attention.

Another object of the invention is to provide such apparatus capable of storing the replacement items within a cabinet in a manner which achieves maximum economy of space.

Yet a further important object of the invention and attainable in the achievement of the foregoing object is to provide novel shelf structure in the apparatus for individually supporting each item, the shelves being foldable to minimize the space occupied thereby when not actually supporting an item.

Still another highly important object of this invention is to provide novel mechanism for dispensing products from storage within a temperature controlled cabinet through an opening to a customer accessible location with an element of the mechanism serving to close the opening for minimizing temperature variations within the cabinet.

A further object of this invention is to provide novel pusher elements utilized for closing the cabinet opening and configured to permit a certain amount of leakage of air from within the cabinet onto the customer accessible location for maintaining the item in such location at substantially the same temperature as the interior of the cabinet.

Another object of the instant invention is to provide novel control structure for sensing the absence of a product in the customer accessible location to initiate replacement of the product by the apparatus and operable to deactivate the dispensing mechanism to prevent continuous cycling of the dispensing mechanism when all of the products have been removed from the cabinet.

These and other objects of this invention will be more fully explained or become apparent in the following specification and appended claims.

In the drawings:

FIGURE 1 is a front perspective view of an apparatus constructed pursuant to the principles of this invention;

FIG. 2 is a fragmentary, vertical, cross-sectional view through the cabinet, certain parts appearing in elevation and broken away to reveal details of construction;

FIG. 3 is a fragmentary, side elevational view, partially in section, of the dispensing and conveyor mechanism, parts being broken away to reveal details of construction;

FIG. 4 is a fragmentary, front elevational view similar to FIG. 3 with parts broken away;

FIG. 5 is a view taken along lines 5—5 of FIG. 4;

FIG. 6 is a view taken along lines 6—6 of FIG. 2;

FIG. 7 is a view taken along lines 7—7 of FIG. 4; and

FIG. 8 is a schematic wiring diagram for the apparatus of this invention.

A dispensing apparatus constructed pursuant to the principles of this invention is broadly designated 10 in the drawings and includes a cabinet 12 housing a plurality of product dispensing units 14 and 15. Each of the units 14 and 15 comprise a plurality of separate dispensing sections disposed in side-by-side relationship for dispensing a plurality of articles from apparatus 10 as is shown in FIG. 1.

All of the dispensing sections of the units 14 and 15 are identical and, in the interest of brevity, only one section broadly designated 16 in FIGS. 3, 4 and 5 has been shown in detail.

Referring now particularly to FIGS. 1 and 2, it may be seen that the cabinet 12 includes a top wall 18, side walls 20, a front wall 22 and a floor 24. An upper, generally horizontally disposed display counter 26 extends between side walls 20 and is connected along its rear edge with a vertically extending panel 28 which is suspended from top wall 18 by an elongated, Z-shaped bracket 30 as shown in FIG. 2. Panel 28 is provided with a series of side-by-side, generally rectangularly shaped openings 32 with the bottom edge of each opening 32 being in alignment with the upper surface of counter 26. It will be understood that there is an opening 32 provided for each dispensing section 16 within the rear dispensing unit 14. Another display counter 34 extends between side walls 20 on a level below that of counter 26 and spans the distance between front wall 22 of cabinet 12 and a vertically extending panel 36 secured in depending relationship to counter 26 by a Z-shaped bracket 38 as best shown in FIG. 2. Panel 36 is also provided with openings 32 identical with the openings in panel 28, for communicating the respective sections 16 of the front dispensing unit 15 with counter 34.

As shown in FIGS. 1 and 2, the rear dispensing unit 14 is disposed in offsetting relationship at a slightly higher elevation than the front unit 15 and counter 26 projects forwardly from unit 14 and overlies the front unit 15 while counter 34 projects forwardly from unit 15. A diagonally disposed cover 40 overlies the respective counters 26 and 34 and includes a pair of inclined glass panels 42 to permit visual inspection of the products displayed on the respective counters. The panels 42 are spaced apart to provide customer access to the products on the counters 26 and 34. Diagonally disposed mirrors 44 extend the length of each counter 26 and 34 for presenting a clearer view of the products displayed thereon and for enhancing the aesthetic appearance of the products.

The dispensing units 14 and 15 are substantially identical with the exception of certain minor variations which will be more fully described hereinafter. Accordingly, it is not deemed necessary to describe each unit in detail.

Each dispensing unit includes a frame comprising a pair of elongated, horizontally disposed angle members 46 extending in spaced parallelism and interconnected at each end by cross members 48. A pair of opposed, spaced, transversely U-shaped channels 50 and 52 each having inwardly extending flanges 54 and integral bight sections 56 as best shown in FIG. 5 have respective upper ends thereof secured to corresponding angle members 46 and extend vertically therefrom. The lower ends of the channels 50 and 52 are secured to a horizontally extending, transversely U-shaped bottom member 58.

Each section 16 includes a conveyor means broadly designated 60 for successively shifting products stored in section 16 upwardly by increments and into position to be pushed through opening 32. Conveyor 60 includes a chain drive 62 and a plurality of shelf structures 64 carried by drive 62. Drive 62 is comprised of a pair of endless chains 66, each chain being trained around upper and lower sprockets 67 journalled for rotation on suitable shafts 68 and 70 carried by corresponding channels 50 and 52 so that one chain 66 moves on a vertical path of travel lying between the spaced flanges 54 of channel 50 and the other chain 66 moves on a similar path between the flanges 54 of channel 52. The upper sprockets 67 for each chain 66 are journalled on stub shafts 68 mounted on the bight sections 56 of the respective channels 50 and 52 while the lower sprockets 67 are mounted for rotation with elongated, horizontally disposed shafts 70 extending through suitable aligned bearings 69 in each of the channels 50 and 52.

Each shelf structure 64 includes a first, generally flat section 72 having a pair of integral, parallel downturned flanges 74. An inwardly extending shaft 76 carried by a link of the proximal chain 66 is received through a hole in the adjacent flange 74 for pivotally coupling the structures 64 to chains 66. It will be understood that each chain 66 includes a series of shafts 76 at spaced intervals therealong, each shaft 76 being rigidly carried by a link of the corresponding chain 66. As shown best in FIG. 3, the shafts 76 of the two chains 66 are paired, each pair being disposed in axial alignment to provide means to permit the respective structures 64 to pivot about a horizontal axis defined by the shafts 76.

The flanges 74 for each structure 76 are maintained in proper spaced relationship from the proximal chain 66 by cylindrical spacers 78 telescoped over each shaft 76 between the corresponding flange 74 and the respective chain 66. Further, each pair of shafts 76 are maintained in axial alignment by an elongated, tubular member 80 received over the innermost ends of an aligned pair of shafts 76 between the flanges 74.

The flanges 74 are provided with shoulders 82 extending substantially perpendicular to the surface of section 72 and are engageable with a vertically extending wall 84 disposed between a pair of channels 50 and 52. When the shoulders 82 of flanges 74 are in engagement with wall 84, the shelf structure is held in outwardly projecting disposition with respect to wall 84 as shown best in FIG. 4. Wall 84 terminates substantially below the axis of rotation of the upper sprockets 67 as shown in FIG. 4 to permit downward pivoting of the shelf structure 64 from said outward projecting disposition to a position thereof lying substantially along the plane of the innermost stretch of chain 66 when a structure 64 is moved to a position with shoulder 82 out of engagement with wall 84.

Each shelf structure 64 includes a second generally flat section 86 rigidly secured to a section 72 and biased toward a folded position upon section 72 by spring means 88. An elongated rib 90 across the upper surface of section 72 and an elongated flange 92 at the outer edge of section 86 enhance the structural rigidity of the respective sections 72 and 86 and provide the support structure upon which a plate 92 or similar container for a product may be supported on shelf structure 64 when the outer section 86 is unfolded to its extended position with respect to section 72.

It will be readily understood that a plurality of spaced shelf structures 64 are carried by drive 62 with each shelf structure being adapted to support a product thereon for shifting the products by increments along a vertical path of travel into a position adjacent the openings 32 as the drive 62 is moved by a prime mover such as an electric motor 94. Motor 94 for the rear dispensing unit 14 is coupled to shaft 70 through a drive 96 for driving the lowermost sprockets 67, as shown in FIG. 8, since motor 94 is mounted beneath unit 14. Motor 94 for the front dispensing unit 15 includes a gear reduction unit 98 having an output shaft (not shown) directly connected with shaft 70.

A cam member in the nature of a flexible spring 100 is secured to member 46 at the upper end of channel 52 in disposition to engage one of the flanges 74 of each shelf structure 64 as the latter is carried around the uppermost sprockets 67 for tipping the shelf structures 64 into a position shown in dotted lines in FIG. 4. This insures that each succeeding shelf structure 64 does not interfere with the preceding structure 64 as the direction of movement thereof is reversed when the shelves move around sprockets 67. This tipping action of the structures 64 also insures that they clear the upper end of wall 84 as they are lowered between channels 50 and 52.

Each dispensing section 16 includes pusher mechanism broadly designated 102 comprising drive means 104 and a shiftable pusher element 106. Drive means 104 includes an electric motor 108 and an endless chain 110 extending between a pair of spaced sprockets 112 mounted on an elongated, transversely U-shaped channel members 114 and extending perpendicular to the direction of movement of chains 66. Motor 108 is operably coupled with one of the sprockets 112 for moving chain 110 in a clockwise direction as viewed in FIG. 3. A pair of elongated, parallel, vertically spaced rails 116 are carried on the inner surfaces of the flanges of member 114 and cooperate with slots 118 in the upper and lower surfaces respectively of a generally rectangular block 120 to provide a track upon which block 120 may be reciprocated in a direction toward and away from opening 32 along a rectilinear path of travel. An outwardly projecting stud 122 is carried by one link of chain 110 and the outer end of stud 122 is received in a vertically extending slot 124 in one side of block 120 in a manner to permit block 120 to be reciprocated along rails 116 as chain 110 moves around sprockets 112.

An elongated angle member 126 is rigidly secured to block 120 for reciprocation with the latter. A transversely L-shaped pusher plate 128 is rigidly secured proximal the lower end of member 126 and extends laterally therefrom to present a substantial surface comprised of the upstanding leg 130 of plate 128 which surface moves toward and away from opening 32 as block 120 is reciprocated upon rails 116. A brace member 132 extends diagonally between member 126 and leg 130 of plate 128 in a manner illustrated in FIG. 4 for stabilizing plate 128.

An electrical switch 134 is mounted on member 114 by means of an elongated angle bracket 136. A switch arm 138 carried by switch 134 is disposed to be engaged by member 126 when pusher element 106 is moved to one extreme end of its path of travel as illustrated in full lines in FIG. 3. It may be seen in FIGS. 3 and 4 that the upstanding leg 130 of pusher plate 128 is disposed in substantial blocking relationship with respect to the proximal opening 32 when element 106 is in this extreme position, it being noted that the corners of upstanding leg 130 are removed so that opening 32 is not entirely closed, the reason for which will be explained more fully hereinafter.

A second electrical switch 140 is mounted on bracket 136 proximal the other end of the latter and a switch arm 142 extends into the path of travel of member 126 for operation by the latter when element 106 is reciprocated to the other end of its path of travel as shown in dashed lines in FIG. 3.

As chain 110 makes a complete revolution around sprockets 112, a lug 144 carried by one of the links of chain 110 engages a switch arm 146 to operate an electrical switch 148 which is mounted on the bottom surface of member 114 by a bracket 150.

A cam wheel 152 provided with notch 154 in the peripheral margin thereof is rigidly mounted on the output shaft of gear box 98 for the front unit 15 as shown best in FIG. 6. An electrical switch 156 is mounted on a bracket 160 adjacent wheel 152 and has a switch arm 162 which rides on the outer peripheral surface of wheel 152 and is operated as arm 162 enters notch 154 as wheel 152 is rotated by motor 94. Since the prime mover 94 for the rearmost unit 14 of apparatus 10 is located beneath the unit 14 and is operably coupled with the lower shaft 70 thereof through drive 96 and a gear box 164, cam wheel 152 for unit 14 is rigidly mounted directly on the output shaft of gear box 164 as illustrated in FIG. 2. It will be readily understood that a switch 156 for unit 14 is mounted on a flange of bottom member 58 and is operated in the same manner as set forth above.

As is illustrated in FIG. 2, an electrical switch 166 is mounted on a bracket 168 which depends from the bottom surface of counter 26 in position to be actuated by an arm 170 which is pivoted to counter 26 and projects upwardly through an opening in the latter in position immediately in front of an opening 32. Arm 170 is normally biased upwardly by spring means not shown and is swingable into engagement with switch 166 when a product (such as a plate of food or the like) is moved into engagement with arm 170. An identical switch 166 and arm 170 is situated at each position on counter 26 and counter 34 in front of an opening 32. The counter switches 166 situated adjacent each opening 32 of apparatus 10 operate to sense the presence of a product on the respective counters 26 and 34 at these positions adjacent the openings 32.

A manually operable switch 174 is provided for each section 16 of apparatus 10 and is conveniently located on the rearmost angle member 46 wherein an operating button 176 associated with switch 174 is in disposition for manual operation of switch 174 for a purpose to be described hereinafter.

Referring now to FIG. 8 wherein is set forth a schematic wiring diagram illustrating the control means for apparatus 10, it may be seen that a line 178 adapted to be coupled with a source of electrical energy is connected with the pole piece of switch 166 by a lead 180 and to the pole piece of switch 174 by a lead 182. The normally open contact 184 of switch 166 is connected to the normally closed contact 186 of switch 134 by a line 188. A normally open contact 190 of switch 134 is connected by line 192 with a normally open contact 194 of switch 156 while the pole piece of the latter is connected to a line 196 by a short lead 198. Line 196 is connected to one side of motor 94 and to the normally open contact 200 of switch 140. The other side of motor 94 is connected with a line 202 also adapted to be coupled to the source of electrical energy. A lead 204 couples line 202 to one side of motor 108 while the other side of the latter is electrically coupled with switch 148 by lead 206. The normally closed contact 208 of switch 148 is electrically coupled with switch 134 by a line 210 and the normally closed contact 212 of switch 166 is electrically coupled with a line 214 by a lead 217 while line 214 electrically interconnects the normally opened contact 216 of switch 148 and the normally opened contact 218 of switch 174. The normally closed contact 220 of switch 140 is coupled to line 192 by lead 222.

*Operation*

Apparatus 10 is initially stocked with products to be dispensed therefrom by placing a product container such as a plate or dish 92 on each shelf structure 64 projecting from a corresponding wall 84 as shown best in FIGS. 3 and 4. The operator merely unfolds the section 86 from its folded position on its corresponding section 72 and sets the plate on the shelf structure 64 wherein the sections are held by the weight of the product and plate in their extended, unfolded position. Since each of the sections 16 of apparatus 10 are identical in construction it will be appreciated that a substantial number of the products can be stocked in apparatus 10. It is contemplated that the interior of cabinet 12 will be maintained in temperature controlled condition by a heating or refrigeration unit 232 illustrated generally in FIG. 2. Thus, if apparatus 10 is being utilized for dispensing food items in a cafeteria line the same may be maintained in refrigerated or heated condition as required.

After the shelves have been stocked with items to be dispensed and there is an item in disposition on the arm 170 of the counter switch 166 located in front of the corresponding opening 32 for unit 16, the dispensing unit is in condition for automatic operation. When a customer selects an item from the counter, removal thereof from engagement with arm 170 permits shifting of the pole piece of switch 166 to energize motor 108 through a circuit extending from line 178 through lead 180, switch 166, contact 184, lead 188, contact 186, switch 134, line 210, contact 208, switch 148, lead 206, motor 108, lead 204 and line 202. Motor 108 drives chain 110 in a counterclockwise direction as viewed in FIG. 3 causing movement of the pusher element 106 to the rear and away from opening 32. As the pusher element 106 withdraws from its initially forward position adjacent opening 32, and engaging switch arm 138, switch 134 is thereby operated wherein the pole piece of switch 134 is disengaged from contact 186 and engages contact 190. Motor 108 continues to be energized, however, through a circuit extending from line 178, switch 140, contact 220, lead 222, line 192, contact 190, switch 134, line 210, contact 208, switch 148, lead 206, motor 108, lead 204 and line 202. This continues the movement of the pusher element 106 to the rear until member 126 engages arm 142 of the rear limit switch 140 wherein the latter is operated to break the circuit just described, thereby cutting off energy to the pusher motor 108. Operation of switch 140, however, closes a circuit for the conveyor motor 94 which extends from line 178 through switch 140, contact 200, line 196, motor 94 and line 202. Motor 94 then drives chains 66 about sprockets 67 in a counterclockwise direction as viewed in FIG. 4 to move a shelf structure 64 into position between pusher element 106 and opening 32. The upward movement of shelf structure 64 is continued until switch 156 is operated by cam wheel 152 which occurs just prior to the shelf structure 64 reaching a position level with the lower edge of the opening 32. Operation of switch 156 reenergizes the pusher motor 108 through a circuit extending from line 178, switch 140, contact 200, line 196, lead 198, switch 156, contact 194, line 192, contact 190, switch 134, line 210, contact 208, switch 148, lead 206, motor 108, lead 204 and line 202. At this point in time, the conveyor motor 94 is still energized and continues to move the shelf structure 64 upwardly but just as soon as pusher motor 108 becomes energized through the operation of switch 156, the forward motion of the pusher element 106 causes switch 140 to return to its unoperated condition. Slight continued operation of the conveyor motor 94 re-operates switch 156 as arm 162 moves out of notch 154 in cam wheel 154. This breaks off the energizing circuit to motor 94 whereupon upward movement of the shelf structure 64 is terminated. The upward movement of structure 64 is stopped when the upper surface of the shelf sections 74 and 86 are generally aligned with the bottom edge of opening 32.

With motor 94 stopped, pusher 106 moves forwardly toward opening 32 and contacts the item resting on the shelf structure 64. Continued forward motion of pusher element 106 pushes the item from the shelf structure through opening 32 and on to the counter where the item physically contacts arm 170 of switch 166 causing operation of the latter. Lug 144 carried by chain 110 engages the arm 146 of switch 148 after the item contacts switch arm 170 on the display counter. Operation of switch 148 momentarily interrupts the circuit energizing the pusher motor 108 but if an item has been pushed into proper position on the display counter and switch 166 is thereby operated an energizing circuit for motor 108 is closed and may be traced from line 178 through lead 180, switch 166, contact 212, line 217, line 214, contact 216, switch 148, lead 206, motor 108, lead 204 and line 202. Thus, motor 108 remains energized for turning chain 110 whereby lug 144 is only momentarily engaged on arm 146 of switch 148. The latter is in its operated condition for a relatively short length of time whereupon switch 148 immediately returns to its unoperated condition. This permits pusher motor 108 to remain energized through its normal energizing circuit previously described. As the element 106 reaches its forward position it makes physical contact with the arm 138 of switch 104 to operate the latter to cut off power to motor 108, thereby concluding the dispensing cycle.

If, on the other hand, there had been no items remaining on the shelf structures 64 (by, for example, all of the items having been dispensed to the display counters previously) the forward motion of pusher element 106 could not move an item onto the display counter switch arm 170 for operating switch 166. Thus, operation of switch 148 by lug 144 would de-energize motor 108. Lug 144 is located on chain 110 in such position that switch 144 is operated when pusher element 106 is in the dashed line position illustrated in FIG. 3 disposed proximal and slightly to the rear of opening 32. Thus, element 106 would be stopped in this position by operation of switch 148 if there were no item availble to be pushed onto the display counter switch arm 170. This position of element 106 is sufficiently close to the opening 32 for substantially closing the latter to maintain the temperatures within cabinet 12 substantially uniform but element 106 is not sufficiently forward on its rectilinear path of travel to cause operation of switch 134 which, in turn, would otherwise result in re-energization of motor 108 through a circuit extending from line 178 through lead 180, switch 166, contact 184, line 188, contact 186, switch 134, line 210, contact 208, switch 148, lead 206, motor 108, lead 204 and line 202.

When element 106 stops in the dotted line position thereof as shown in FIG. 3 prior to moving into the position for operating switch 134, it is necessary to complete the previous cycle by causing element 106 to move to the full line position thereof as illustrated in FIG. 3 prior to the initiation of subsequent automatic cycling operations after the restocking of the shelf structure 64 of section 16. This is accomplished by the operator manually depressing button 176 to operate switch 174. This completes an energizing circuit for motor 108 from line 178 through lead 182, switch 174, contact 218, line 214, contact 216, switch 148, lead 206, motor 108, lead 204 and 202. Operation of motor 108 moves chain 110 which removes lug 144 from engagement with arm 146 of switch 148 thereby permitting the latter to return to its normal position and since there is no item on the display counter switch arm 170, the system goes through a normal cycle to supply the display counter as previously explained. Upon the operation of a complete cycle, element 106 is stopped in the full line position thereof illustrated in FIG. 3 because a product is pushed into engagement with the display counter switch arm 170, whereupon the system is ready for a subsequent automatic operation. Each cycle of such operation is initiated by the removal of an item from the display counter and is concluded when the next successive product has been pushed through opening 32 and onto the display counter.

Referring now, to FIG. 2, the rear of cabinet 12 is normally closed by a pair of juxtaposed, sliding doors 224 and 226 to prevent loss of heat or cold from within cabinet 12. Doors 224 and 226 are slidable to one side or the other of the rear of cabinet 12 to permit access to the units 14 and 15 so that the units may be restocked. Access to the rear of unit 14 is available immediately upon the moving of doors 224 and 226 to one side, but it is necessary to move the rear unit 14 to provide access to the front unit 15. Thus, unit 14 is constructed to swing on a vertical upright 228 extending from top 18 and bottom 24 of cabinet 12. Hinge means 230 secured to one corner of unit 14 and upright 228 permits outward swinging of unit 14 through the open back of cabinet 12 to thereby afford access to the rear of the front unit 15. After the front unit is re-stocked, unit 14 is swung back into place where it may be releasably secured by any suitable latch means (not shown). Following the restocking of units 14 and 15, doors 224 and 226 are closed to permit refrigeration or heating of the interior of cabinet 12 to thus maintain the products stored therein at desired temperature levels.

Although the upright leg 130 of pusher element 106 automatically returns to its locking position adjacent opening 32 at the end of each dispensing cycle, the opening 32 is not entirely closed thereby. This permits a controlled amount of leakage from within cabinet 12 of temperature conditioned air on the products on the display counters. This tends to maintain the products at suitable temperatures while displayed on the serving counters until they are removed by a customer.

Even when a section 16 has been completely sold out of products, the pusher element 106 is automatically stopped in proximal closing relationship with respect to the respective opening 32 as herein explained. This assists in maintaining the interior of the cabinet at relatively uniform temperatures to maintain the products remaining in the other sections of the dispensing units of apparatus 10 at desired temperatures.

After an item has been pushed therefrom, the shelf structure 64 located immediately beneath pusher element 106 is maintained in its unfolded condition by engagement of section 86 on a bottom flange of pusher plate 128 when element 106 is in its blocking position with respect to opening 32. The flange of plate 128 is inclined slightly upwardly toward the rear to permit sliding of plate 128 on the upturned flange 92 of section 86 of shelf structure 64 when element 106 is moved to the rear. Element 106 shifts to the rear sufficiently far to clear section 86 of shelf structure 64. This permits outer section 86 to be automatically folded by spring 88 upon inner section 72 as element 106 reaches its extreme rearmost position on its path of travel. This results in a reduction of the length of each shelf, measured from its axis of pivot on chains 66 to its outer edge, by about one-half after the shelf is no longer supporting a product.

In continuous conveyors of the paired chain type heretobefore available, this dimension of the shelves set a serious restriction on capacity of dispensing machines. The shelves are designed to swing in the space between chains 66 as the corresponding portion of the chains to which the respective shelves are attached move around the sprockets 67. Thus, the shelves assume a generally vertical position during such movement. The capacity of the conveyor is determined by the number of shelves carried by the chains and this number is diminished if the spacing between the shelves when in their product supporting positions is greater than is necessary to accommodate the products to be dispensed by the apparatus. It is necessary, however to have such spacing slightly greater than the shelf length to permit each shelf, in turn, to swing to its vertical position as it approaches the upper sprockets, without interfering with the next adjacent shelf therebelow. By reducing the length of the shelves by one-half before they swing to the vertical position the novel shelves of this invention may be spaced relatively close together to increase the capacity of the conveyor over that heretofore possible with prior machines, while still maintaining adequate product supporting capabilities when the shelves are in their unfolded positions.

Attempts have heretofore been made to improve conveyor capacity by rigidly securing the shelves to the chains, thereby eliminating the swinging of the shelves to vertical positions. However, conveyors of this type require additional space at the top and at the rear of the conveyor to accommodate the shelves which project outwardly from the chains at all times. This requires additional cabinet space, the necessity for which is eliminated by the shelves of this invention.

Further, it is pointed out that with these novel folded shelves, the clearance provided for shelf passage below the conveyor is half that which would be necessary with shelves which are not folded.

Having thus described the invention, what is claimed as new and desired to be secured by Letters Patent is:

1. In a dispensing machine having a cabinet provided with an opening, a product conveyor comprising:
   a pair of spaced-apart, rotatable structures;
   an endless, flexible element trained around the structure for movement thereby;
   a plurality of shelves swingably mounted on the element for movement therewith;
   power means operably coupled with one of the structures for rotating the latter to move the element; and
   means disposed to maintain at least certain of the shelves in product supporting disposition extending outwardly from the element when the shelves are moved in one direction, each shelf comprising an inner section adjacent the element and an outer section normally folded on the inner section with surfaces thereof normally generally parallel with the element for minimizing space occupied by the shelf, each outer section being mounted on a respective inner section for movement in relationship thereto to an extended position to thereby present a product-supporting disposition.

2. Apparatus as set forth in claim 1, wherein is provided spring means engaging both of said sections for biasing the outer section toward folded relationship with the inner section.

3. Apparatus as set forth in claim 1 wherein said maintaining means includes shoulder means on each shelf and an elongated, rigid member in the cabinet and extending into disposition to be engaged by the shoulder means as the shelves are carried in said one direction by the element, the shoulder means being configured to swing each shelf outwardly from the element about the point of swingable mounting of the shelf thereon when the shoulder means is brought into engagement with the member by said element.

4. Apparatus as set forth in claim 3, wherein said structures are disposed in vertical spaced relationship, the member terminating in spaced relationship from the uppermost of said structures whereby each shelf is free to pivot from said projecting position through gravity before the direction of the respective shelf is reversed as the shelf is moved around said uppermost structure by the element.

5. Apparatus as set forth in claim 4, each shelf having a flange, and cam means extending into said path proximal said uppermost structure, said cam means being successively engageable by the flange of each shelf for tipping the respective shelf away from the other shelves as the shelf is moved around said uppermost structure to obviate interference of said shelf with the other shelves.

6. In product dispensing apparatus:
   structure presenting a housing having a temperature controlled interior area and provided with a product opening therein;
   support means on the housing at said opening defining a product-receiving access station;
   product-moving means within the housing for receiving a plurality of products and operable to move a next to be dispensed product into an unloading position substantially aligned with the opening, said product moving means including a series of spaced-apart, movable shelves, each shelf being adapted for supporting a product thereon, and conveyor means coupled with the shelves for moving the latter past said opening with each shelf being successively moved into said unloading position;
   product pushing means including an elongated track and a pusher element having a product engageable surface, said element being operably engaged on the track for reciprocable shifting movement on a substantially rectilinear path of travel between a normal location within said product opening of the housing to an inner location clearing said next to be dispensed product as the latter is moved by the product moving means to said unloading position, said element being configured to at least partially close the opening when therewithin to minimize temperature variations within said housing;
   cyclically operable drive mean coupled to said product moving means and the pusher element for shifting the latter along said track to said inner location of the same, thereafter operating the conveyor means to bring said next to be dispensed product into said unloading position and finally return the pusher element to said normal location thereof as the product engageable surface of the pusher element engages the product to shift the latter onto said station; and
   control mechanism including electrical circuitry operably coupled with the drive means for energizing the latter and a switch in said circuitry and disposed at said access station in position to be engaged by a product, said switch being operable to energize said drive means through the circuitry to render the drive means operative to shift said element from the normal location to said inner location only after an individual product has been removed from said station.

References Cited by the Examiner
UNITED STATES PATENTS

| | | | |
|---|---|---|---|
| 2,493,956 | 1/1950 | Ewertz | 312—36 X |
| 2,589,099 | 3/1952 | Larkin | 312—36 X |
| 2,950,605 | 8/1960 | Hennion | 312—97 X |

CLAUDE A. LE ROY, *Primary Examiner.*

JOHN PETO, *Examiner.*